Aug. 19, 1969 L. P. MARTUCH ET AL 3,461,593
FISHING ROD
Filed Sept. 22, 1967 2 Sheets-Sheet 2
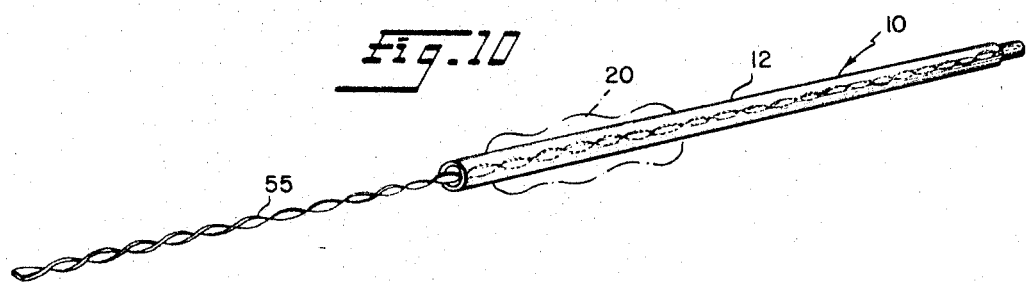
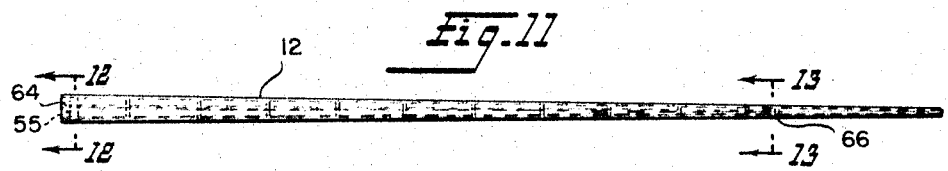
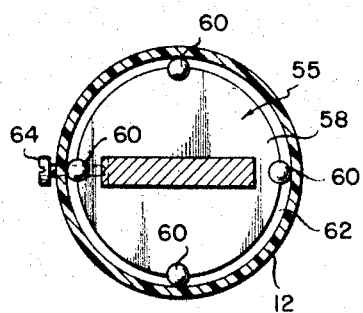
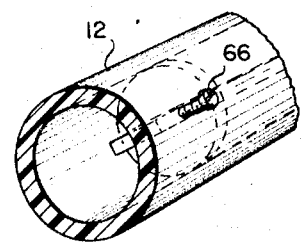
INVENTORS
Leon P. Martuch
Leon L. Martuch
BY Dean Laurence
ATTORNEY

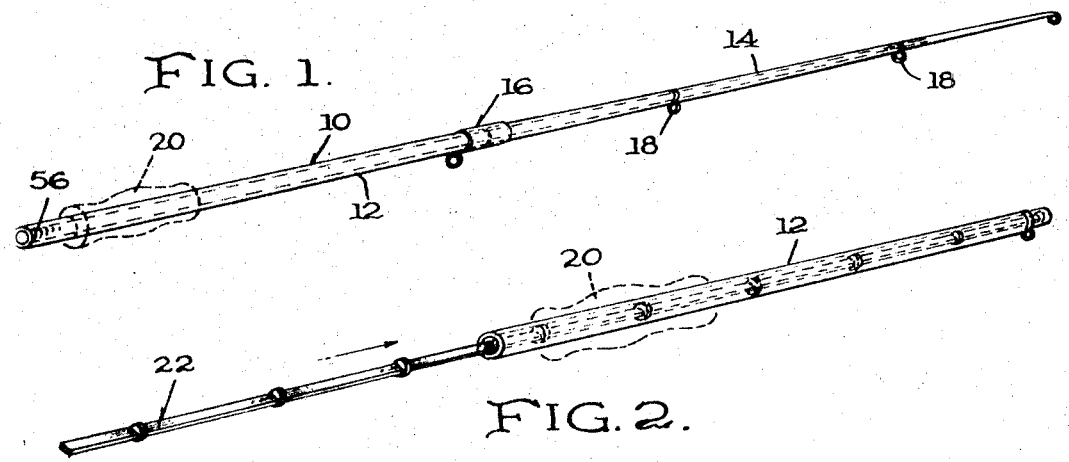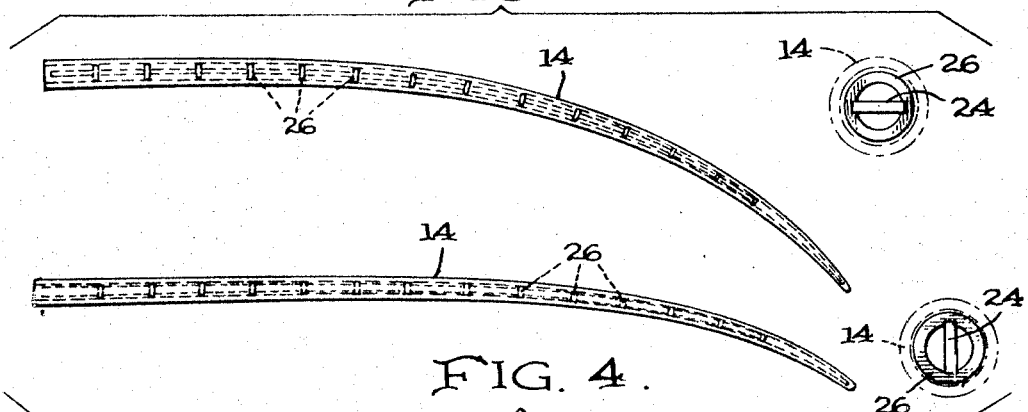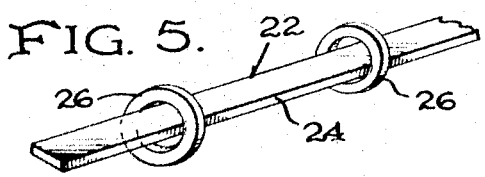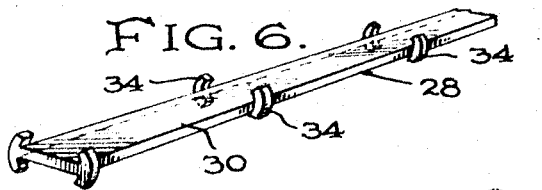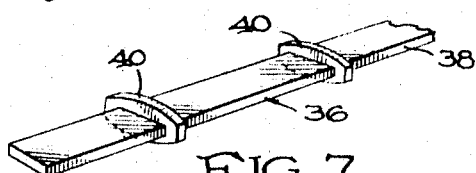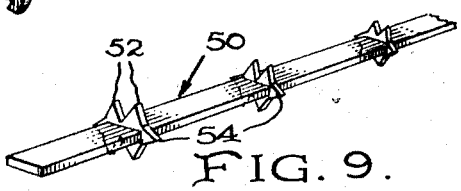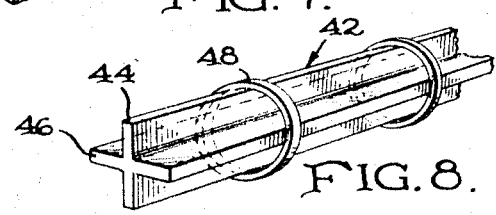

United States Patent Office 3,461,593
Patented Aug. 19, 1969

3,461,593
FISHING ROD
Leon P. Martuch, 4102 Jefferson Ave., and Leon L. Martuch, 1209 Glendale, both of Midland, Mich. 48640
Filed Sept. 22, 1967, Ser. No. 669,734
Int. Cl. A01k 87/00; A63b 53/10, 53/12
U.S. Cl. 43—18                                              12 Claims

ABSTRACT OF THE DISCLOSURE

A fishing rod made of generally hollow tubular configuration in which is disposed a reinforcing member that can be readily rotated or moved to different positions so that the fishing rod is provided with varying degrees of stiffness. In this manner, the rod may be made more flexible or less flexible as desired in order to vary the action of the rod during fishing.

---

At the present time, fishing rods are generally made of fiber glass reinforced plastic material and they are generally referred to as glass rods. These rods may be made of one piece, two pieces, three pieces, or any desired number of pieces. Most of these rods are of tubular elongtaion configuration and comprise a progressively tapered tube of fiber glass material. The present invention will be described for purposes of illustration only, in connection with a rod made of two parts. The butt part or portion is generally of larger diameter than the tip portion and the thickness of the wall of the butt portion is generally greater than that of the tip portion with the tip portion being adjacent the outer end of the rod away from the angler. The fishing rod is designed so that these two sections, namely the butt and the tip are joined together by some sort of a connection called the ferrule. The rod is also generally made of a predetermined strength for a particular type of fishing, such as a rod that is made for a relatively light, type of fishing such as casting. This type of fishing rod is very flexible. Another type of rod may be made for fishing for extremely large and powerful fish, such as the rods used for fishing from a boat in the ocean.

It is an object of the present invention to provide a fishing rod having insert means therefor which can convert a light flexible rod used to cast into a type of rod such as a relatively stiff, heavy rod, used to fight extremely large and powerful fish.

It is another object of the present invention to provide insert means for positioning within the sections of a fishing rod so as to reinforce the fishing rod and give it a relative stiffness compatible with the type of fishing it is intended to use the rod with.

Another object of the present invention is to provide insert means for a hollow fishing rod that can be rotated within the hollow fishing rod so as to change the flexibility of the rod to provide a rod that gives the action that is compatible with the type of fishing the angler is doing such as light casting to medium or heavy casting.

In the present invention, a hollow tubular fishing rod that is generaly tapered from its butt section to a smaller diameter adjacent its tip section is provided with an insertible reinforcing member that has a cross-section that can be turned so as to provide a stiffening for the fishing rod and prevent substantially any amount of bending at the tip of the rod at one time, and which can be rotated or turned to another position so as to allow great flexibility and bending at any portion along the rod at another time.

Various other objects and advantages of the present invention will be readily apparent from the detailed description when considered in conection with the accompanying drawing forming a part thereof and in which:

FIGURE 1 is a perspective view of a fishing rod embodying the present invention;

FIGURE 2 is a perspective view of the butt end of the fishing rod illustrating the insertable member being positioned therein;

FIGURE 3 is a composite diagrammatic side view of the fishing rod or pole of the present invention and an enlarged view of the insert, seen from the end of the insert, shown disposed therein so that the rod is in a flexible position;

FIGURE 4 is a view similar to FIGURE 3 but illustrating the insertable member rotated 90° and the rod in a less flexible position;

FIGURE 5 is a perspective fragmentary view of the reinforcing insert member shown in FIGURE 4 comprising a plurality of spaced rings disposed along a flat elongated member;

FIGURE 6 is a perspective view of another embodiment of the insert member of the present invention;

FIGURE 7 is still a further modification of the insert member embodied in the present invention;

FIGURE 8 is still another modification of the insert member embodied in the present invention;

FIGURE 9 is yet another modification of the insert member embodied in the present invention;

FIGURE 10 is a perspective view of the butt end of the fishing rod illustrating an insertable member positioned therein which may be anchored at one end and rotated at its other end so that it is in a position that is twisted;

FIGURE 11 is a view of a fishing rod with means therein for permitting twisting or turning of the insertable member and fixing it in any desired position;

FIGURE 12 is an enlarged detail view taken along the line 12—12 of FIGURE 11; and FIGURE 13 is an enlarged perspective view of a portion of the rod showing a cross-section of the rod taken along the line 13—13 of FIGURE 11.

Referring to the drawing, the reference numeral 10 generally designates a fishing rod or pole that has a butt section 12 and a tip section 14 that are connected to each other by any well-known ferrule means 16. The butt and the tip sections are made of well-known fiberglass reinforced plastic material and is generally referred to as a glass rod. The butt and the tip sections are hollow and form tubular sections with the butt section 12 being of larger diameter than the tip section 14, and the wall thickness or cross-section of the tubular butt section being thicker than the wall thickness of the tip section. It is also to be noted that variations in the "action" of the rod, that is the bending along the rod is achieved by differences in the diameter of the tubular sections and the wall thicknesses at varying points along the length of the rod, with the over-all rod comprising a progressively tapered tube. The rod may be provided with the usual guides 18 disposed therealong for receiving the fishing line therethrough. The rod may be further provided with a handle 20 shown in dotted line in FIGURE 1.

In accordance with the present invention an insert member generally designated 22 is provided for positioning within the rod. The insert 22 may be of sufficient length so as to extend approximately the full length of the rod, as shown in FIGURE 3, or it may be of such a length so as to be disposed in either the butt section or the tip section alone if the ferrule stops the insert from running through both portions or it may extend along certain portions of both the butt and the tip section as desired. The insert member 22 of FIGURES 2 and 5 comprises a substantially flat elongated web 24 of rectangular configuration with a plurality of spaced rings 26 encircling the web and secured thereto. It will be noted that the side edges of the web 24 are secured to the inner surfaces or inner diameter of the rings 26 and the insert member may be of molded plastic material. Referring to FIGURE 2 the insert 22 is pushed into the hollow tubular member forming the butt and the tip section until it is disposed in the position shown in FIGURE 3 and extends substantially completely along the entire length of the fishing rod. The rings 26 may form a sladable fit with the inner surface of the butt and tip sections of the fishing rod so that the insert may be readily inserted within the rod. It is not necesary to have the outer surface of the rings bearing on the inner surface of the hollow fishing rod as they wil still permit the web 24 to have a desired degree of stiffening or reinforcing force.

When it is desired to permit the tip 14 that is shown in FIGURE 3 a great amount of flexibility such as when a person is fly casting the insert member is positioned with the web 24 in a substantially horizontal position with respect to the ground from which one is fishing so that the tip will easily bend, as clearly shown in FIGURE 3.

When it is desired to vary the action of the rod so that there will not be any great amount of bending produced by a force applied at the tip of the rod, or by the weight of a fish thereon, the insert member 22 is turned to the position shown in the end view of FIGURE 4 so that the web 24 is in an upright or vertical position with respect to the ground from which the party is fishing so that the tip 14 of the rod assumes a stiffened position and is relatively rigid.

If it is desired to permit the rod to have a certain amount of flexibility between that shown in FIGURE 3 and that shown in FIGURE 4 the insert member 22 within the rod is turned to a position between a substantially horizontal position and a substantially vertical position with respect to the ground, or in other words is turned approximately 45° from the horizontal so that the flexibility in the rod is greater than that shown in FIGURE 4, but less than that shown in FIGURE 3.

With respect to the embodiment of the invention shown in FIGURE 6 this is substantially the same as that described in connection with FIGURE 5, except that the insert member 28 comprises a web 30 with spaced semicircular or arcuate portions 34 disposed on opposite sides of the web 30. This insert member can be disposed in the position shown in the end view of FIGURE 3 or in a position shown in the end view of FIGURE 4, depending upon whether the fisherman desires to give his rod a great amount of flexibility or to make it relatively rigid In the embodiment of the invention shown in FIGURE 7, the insert member 36 has a web 38 substantially similar to the web 24, except that it no longer has the enlarged rings 26 as in the embodiment of FIGURE 5, but instead it is provided with a plurality of spaced arches 40 of substantially rectangular configuration. This insert member operates in the same way as that described in connection with the insert member of FIGURE 5.

In the embodiment of the invention shown in FIGURE 8, this is substantially the same as that shown in FIGURE 5, except that the insert member 42 is a cross having a vertical web 44 and a horizontal web 46 to which are molded a plurality of longitudinally spaced rings 48.

The embodiment of the invention illustrated in FIGURE 9 comprises a web insert member 50 with upstanding oppositely disposed plural teeth or ears 52 of triangular configuration and laterally extending oppositely disposed teeth or ears 54 of triangular configuration extending from opposite sides of the flat web member.

In the present invention, a cap member such as the cap member 56 adjacent the handle 20 may be secured to the insert member or it may be molded thereto so that the fisherman may grasp the handle 20 and gently rotate the cap member 56 in order to properly rotate his insert member to any position desired.

In the embodiment of the invention illustrated in FIGURES 10 to 13, the insert member 55 therein is similar to the insert member 22 except that it is provided with means that allows it to be twisted or wound up within the fishing rod so as to provide a twisted or wound up or spiral type of reinforcement. The insert 55, as best seen in FIGURE 10, provides a rigid insert member that is substantially more rigid than the embodiment shown in FIGURE 3, while it is not as rigid as the configuration of the embodiment shown in FIGURE 4, but is in rather an intermediate state of rigidness between these two extremes.

Referring to FIGURE 11, it will be seen that one end of the butt section 12 is provided with means for permitting rotation of the insert member to its twisted or wound up stage while the other end of the butt section is provided with means to prevent rotation of the insert member.

Referring to FIGURE 12, it will be noted that the insert member 55 is provided with a circular ring 58 having a plurality of circumferentially spaced roller or ball bearing members 60 in the periphery thereof. The ball bearing members 60 are adapted to be received in a circumferential groove 62 provided on the inner surface of the butt section 12. The provision of the ball bearing members 60 enables the left end of the insert member, as seen in FIGURE 11, to be readily rotated by grasping the flat portion of insert member 55 turning it or rotating it to the desired angle, so that the insert is in a twisted position as shown in FIGURE 10. Thereafter, the left end of the insert member is fixed in its position by threading a set screw 64 inwardly until it abuts the side of the web member.

The right end of the butt section is also provided with a set screw 66 which is threaded into abutting engagement with the web member before the left end of the insert member is twisted or wound up. Thus thus permits the insert member to have one end anchored while its other end is rotated at the other end of the butt section so that it will assume the twisted configuration in order to stiffen the rod in a position such as is shown in FIGURE 10. If desired, a successive number of the rings 58 may be provided with ball bearings adjacent one end of the butt section to readily enable it to become twisted or wound up. Also, if desired, a number of set screws may be provided along the length of the butt section as desired in order to have it assume any twisted or wound up configuration or to permit one section to be readily twisted or rotated while another section is prevented from rotating or turning.

From the foregoing description it is apparent that the present invention provides a fishing rod having a rotatable insert member which can be easily disposed therein so that the fisherman can vary the degree of reinforcement or stiffening so that the flexibility of the fishing rod can be adapted in order to be suitable to the type of fishing it is desired to do.

It is also apparent that the insert member disposed within the fishing rod of the present invention is able to prevent a twisting motion of the fishing rod while casting with it which would tend to throw the cast in the wrong direction and further serves to damp vibrations that are detrimental to casting.

It is also apparent that the rod of the present invention may have several inserts which may or may not be rotatable which would have varying degrees of flexibility.

Thus the present invention provides a fishing rod insert that can be readily inserted and removed from a fishing rod and which can produce a varying degree of stiffness, depending on cross-section of the insert member and its position with respect to the use of the fishing rod.

Various changes may be made in the relative location, form and arrangement of the several parts of the invention without departing from the essential characteristics thereof.

What is claimed is:

1. A fishing rod comprising a hollow tubular rod section with a reinforcing member rotatably disposed therein and for a major longitudinal extent thereof and said reinforcing member having a cross-section of varying strength to give a difference in flexibility of the tubular rod section at said cross-section as said reinforcing member is rotated.

2. The fishing rod of claim 1 wherein said reinforcing member comprises an elongated web member extending substantially between opposite sides of the tubular rod section.

3. The fishing rod of claim 2 wherein said web member is provided with a plurality of spacer members along its length adapted to engage portions of the inner surface of said tubular rod section.

4. The fishing rod of claim 3 wherein said spacer members are rings.

5. The fishing rod of claim 3 wherein said spacer members are semi-circular members.

6. The fishing rod of claim 3 wherein said web member forms a cross and said spacer members are rings.

7. The fishing rod of claim 3 wherein said spacer members are rectangular arches enclosing said web.

8. The fishing rod of claim 3 wherein said spacer members are triangular members extending from opposite sides and edges of said web member.

9. A fishing rod comprising a hollow tubular member and a reinforcing member in said tubular member and comprising an elongated flat portion with a plurality of ring means extending in a substantially radial direction therefrom, and means permitting twisting of said flat portion into a wound up configuration.

10. The rod of claim 9 wherein said means includes roller means disposed along one end of said web and screw means along the other end of said web for preventing rotation of said web along said other end.

11. The rod of claim 10 wherein said rod means are circular discs and said roller means are ball bearings and other locking means are provided to fix said web in its wound up position.

12. A fishing rod comprising a hollow tubular rod section with a reinforcing insertable member therein, said reinforcing member being slidably disposed within said rod section and for a major longitudinal extent thereof and removable therefrom and having a particular cross-section of varying strength to provide a difference in flexibility of the rod section at said cross-section.

References Cited

UNITED STATES PATENTS

| 1,494,530 | 5/1924 | Cook | 43—18 |
| 1,994,069 | 3/1935 | Fletcher | 273—80 |
| 3,310,903 | 3/1967 | Binvignat | 43—18 |

FOREIGN PATENTS

| 25,196 | 1911 | Great Britain. |

ALDRICH F. MEDBERY, Primary Examiner

D. J. LEACH, Assistant Examiner

U.S. Cl. X.R.

273—80